2,872,439
POLYMERIZATION CATALYST AND PROCESS

William Frank Gresham and Nikolaus George Merckling, Wilmington, Del., assignors to E. I. du Pont de Nemours and Company, Wilmington, Del., a corporation of Delaware No Drawing. Application August 30, 1954
Serial No. 453,145

3 Claims. (Cl. 260—94.9)

This invention relates to novel catalyst systems and more particularly to catalyst systems useful in the polymerization of ethylene to solid polymers employing tungsten coordination complexes and to the process of polymerizing ethylene using novel tungsten catalyst systems.

Heretofore, it has been widely known that ethylene can be converted to solid polymers under very high pressures in the presence of catalysts which are capable of yielding free radicals under polymerization conditions.

It has also been known heretofore (U. S. Patents 2,212,155, 2,475,520, 2,467,234) that certain metal alkyls and Grignard reagents are capable of initiating the conversion of ethylene to solid polymers through a free radical mechanism at high pressures. Ethylene has also been converted to solid polymers in the presence of hydrogenation catalysts promoted with alkali metals or alkali metal hydrides (British Patent 536,102).

Generally speaking, Friedel-Crafts type catalysts have not been effective for converting ethylene to solid polymers but instead have resulted in the formation of liquid polymers from ethylene; however, it has recently been reported that solid polymers admixed with oils can be obtained by polymerizing ethylene in the presence of aluminum chloride and titanium chloride at elevated temperatures and high pressures and advantageously in the presence of HCl-binding metals like aluminum powder (Fischer, German Patent 874,215, Ausgegeben, April 20, 1933).

Redox systems have frequently been disclosed for polymerization of olefinic compounds. In the past, redox systems have resulted in the formation of highly-branched low density polymers, except at extremely high pressures, at which high density ethylene polymers have been obtained heretofore. In many of these systems a heavy metal compound was employed in combination with a reducing component (cf. U. S. Patents 2,380,473 and 2,383,425). While various theories have been advanced as to the mechanism of polymerization in redox systems, the art of polymerizing olefins in the presence of such combinations of catalyst components has not heretofore advanced to the state at which predictions could be made as to which pairs of oxidizable and reducible components might give good results in the conversion of ethylene to solid polymers except, of course, by further experimentation.

It has been discovered, in accordance with the present invention, that extraordinary and highly useful effects are produced by reducing a compound of tungsten, in the manner hereinafter described, and bringing the resulting mixture into contact with a compound containing ethylenic unsaturation. In specific embodiments it has been found that tungsten compounds containing tungsten combined with radicals (suitable examples being alkoxy radicals, alkyl radicals and radicals which form acids when combined with hydrogen) can be used effectively in the formation of the catalyst. The reduction step is generally performed by admixing a tungsten compound with a strong reducing agent such as compounds having at least one metal to hydrocarbon bond. It is known that such agents will reduce the valence state of the tungsten to a lower state. It is possible that active complexes of tungsten, which are effective in the polymerization of ethylenically-unsaturated compounds, as disclosed herein, are formed by reaction of the tungsten in a low state of valence with the said reducing agent. In particular embodiments a sufficient quantity of the reducing agent is added to the tungsten compound to achieve not only the reduction of the tungsten but in addition, to achieve the formation of the active complex. This active tungsten complex is believed to contain tungsten in certain electron distribution states which give the complex a catalytic activity made use of in this invention. Coordination of the reactive complex with organic components does not necessarily destroy its ability as a catalyst, in fact, it appears that ethylene is capable of coordinating with the active tungsten complex in this manner and quite possibly this phenomenon has a bearing on the mechanism of the polymerization.

The nature of these coordination complexes is not fully understood, but they are evidently active catalysts or catalyst components which are capable of initiating the polymerization of ethylene in an extremely active manner to produce solid ethylene polymers. The density of the polymers obtained through the use of these coordination complexes generally exceeds, at least to some extent, the density of polyethylene prepared by the use of free radical types of catalysts, except those free radical polymerization processes which employ such extremely high pressures as to produce abnormally high density polyethylene as compared with polyethylene made at moderately high pressure (700–1200 atmospheres) by a free radical polymerization process (cf. U. S. Patent 2,586,322).

It is believed that the coordination complexes hereinabove described are novel compounds which have not been employed heretofore in the polymerization of ethylene. The complexes are difficult to isolate in the pure state but their presence can be indicated from the chemical properties of the mixture produced when a tungsten compound is admixed with sufficient quantities of a reducing agent and an ethylenically-unsaturated compound.

While the polymerization of ethylene to produce solid polymers in the presence of catalysts disclosed herein can be carried out under mild conditions, it is preferable, from an economic standpoint, to employ moderately high pressures, suitably from 1 to 200 atmospheres or higher, in order to facilitate the handling of ethylene. Much higher pressures, up to several thousand atmospheres, can be employed, but it is not desirable to do this in view of the extraordinary activity of the catalysts at lower pressures. Similarly, extremely low temperatures may be employed. The preferred temperatures are within the range of about 0–300° C.

The polymerization of ethylene according to the process of this invention, takes place most satisfactorily when the polymerization mixture is substantially moisture-free and also free of other sources of hydroxyl groups. Carbon dioxide should also be substantially excluded. As in numerous other ethylene polymerization processes, the polymerization mixture in the process of this invention is preferably kept free of oxygen, since oxygen reacts with the catalyst. In practical operations the oxygen content should preferably be held below 20 parts per million. Certain compounds which are capable of coordinating with the activated tungsten form coordination complexes which are too stable for optimum results, and accordingly, the presence of these compounds should preferably (although not necessarily) be avoided. In this category are ketones and esters. Hydrocarbon solvents, on the other hand, can be used quite effectively as reaction media.

The reagents which are effective for forming the active tungsten catalyst are compounds having at least one metal to hydrocarbon bond. In this class may be mentioned Grignard reagents, metal alkyls or aryls or similar organometallic compounds. Compounds having two or more metal atoms directly attached to hydrocarbon are included, e. g. PrMg(alkylene)MgBr. An especially preferred class of reducing agents comprises hydrocarbon-soluble compounds, such as $Sn(alkyl)_4$ or compounds of the formula $LiAl(alkyl)_4$, where the alkyl groups have about 4 to 18 carbon atoms.

The novel catalysts described herein are preferably used in dissolved or colloidally dispersed form. The active tungsten complex may be prepared in a separate and prior step. In the latter case, it is advisable to keep the active tungsten complex at around 0° C. and free from water and air contamination so as to avoid the decomposition of the complex.

The invention is illustrated further by means of the following examples:

*Example 1.*—Tungsten hexachloride (.005 mole) was dispersed in 100 cc. of cyclohexane, and .02 mole of tetrabutyl tin was added. The resulting deeply-colored solution was introduced into a 325 ml. shaker tube under a blanket of nitrogen, evacuated, flushed with nitrogen and re-evacuated. The shaker tube was then heated to 150° C. and pressured to 1000 p. s. i. with ethylene and agitated for 30 minutes. Thereupon, the temperature was increased to 200° C. and agitation continued for another 30 minutes. The resulting polymer was filtered from the reaction mixture and washed with a methanol and hydrochloric acid mixture, a methanol and aqueous sodium hydroxide mixture, and finally with acetone. The dry polymer produced weighed 21 grams and exhibited a density of 0.95 and could be compression molded into a tough film.

*Example 2.*—Tungsten hexachloride (0.005 mole) was dissolved in 100 ml. benzene under a blanket of nitrogen and a solution of phenylmagnesium bromide (0.04 mole) in diethyl ether mixed with 50 ml. of benzene was added under stirring. During the addition the temperature of the reaction mixture was kept at 6° C. The resulting mixture was placed into a 325 ml. shaker tube. The shaker tube was evacuated, flushed with nitrogen, and re-evacuated, heated to 160° C. and pressured with 2500 p. s. i. ethylene and agitated for 2 hours. The resulting polymer was filtered and washed by a procedure described in Example 1. The resulting dry polymer gave a tough film on compression molding at 190° C. and had a density of 0.95.

It is to be observed that the foregoing examples are illustrative only and that numerous embodiments of the invention will occur to those who are skilled in the art.

The products obtained by polymerizing ethylene with catalysts hereinabove disclosed are solid polymers exclusively and are not contaminated with Friedel-Crafts type of oily polymers.

The activity of the catalyst depends in part upon the nature of the groups which are attached to the tungsten atom. It is quite possible that this effect depends upon the varying degrees of shielding around the cation, i. e. the shielding power of the group attached to the tungsten influences the activity of the catalyst by influencing the tendency of the tungsten to coordinate. Electrical effects may also play a part in this.

The quantity of catalyst can be varied over a rather wide range. It is desirable to employ a quantity of catalyst which is at least large enough to produce a reasonably rapid rate for a reasonably long period of time. Suitably, the preferred quantity is within the range of .001% to 10% based on the weight of tungsten per unit weight monomer.

The polymers which are made under the conditions hereinabove described frequently have such high molecular weights that removal of catalyst by dissolving and filtering is extremely difficult. An effective procedure for obtaining the polymer in a clean form is to wash with methanol, acetone-hydrochloric acid mixtures in a Waring Blendor several times followed by washing with acetone and thereafter, if necessary, followed by several acetone-aqueous sodium hydroxide washes and finally by acetone-water wash. The products thus obtained are generally white. While this procedure is highly satisfactory for preparing clean polymers, it is to be understood that simpler procedures such as washing with the reaction medium or treatment with water at elevated temperatures will be entirely suitable for various practical applications. For some applications it may not be essential to remove traces of catalyst.

The activity of the novel catalyst described hereinabove is of such a nature that the catalyst is well suited for polymerization of ethylenically-unsaturated compounds other than ethylene, suitable examples of other polymerizable olefinic compounds being propylene, butadiene, styrene, cycloalkenes, etc.

The structure of the polyethylene made in accordance with the process of this invention evidently is characterized by being a straight chain hydrocarbon with vinyl groups at one or both ends of at least some of the molecules. The infrared measurements indicate very little methyl substitution and a very small number of vinylidine groups, with little or no transunsaturation or carbonyl groups.

The ethylene polymers obtained in accordance with the process of this invention are highly valuable in numerous applications, especially in the form of films, molded articles, extruded insulation on wire, etc.

We claim:

1. The process of polymerizing ethylene which comprises contacting ethylene at a temperature of 0° to 300° C. in the presence of an inert liquid hydrocarbon with the reaction product formed on admixing a tungsten chloride with a quantity of tin tetraalkyl sufficient to reduce said tungsten, said alkyl groups having from 4 to 18 carbon atoms, said reaction product being employed in a quantity of 0.001 to 10% by weight of the said ethylene, and recovering a solid polymer of ethylene.

2. The process as set forth in claim 1 wherein the tin tetraalkyl is tin tetrabutyl.

3. The process as set forth in claim 1 wherein the molar ratio of the tin tetraalkyl to the tungsten chloride is 4.

References Cited in the file of this patent

UNITED STATES PATENTS

| | | |
|---|---|---|
| 2,691,647 | Field et al. | Oct. 12, 1954 |
| 2,710,854 | Seelig | June 14, 1955 |
| 2,725,374 | Mosher | Nov. 28, 1955 |
| 2,731,453 | Field | Jan. 17, 1956 |

OTHER REFERENCES

Mellor: Comprehensive Treatise on Inorganic and Theoretical Chemistry, volume 11, page 847.